(12) United States Patent
Wilson

(10) Patent No.: US 6,539,822 B1
(45) Date of Patent: Apr. 1, 2003

(54) TRANSMISSION SHIFTER ASSEMBLY WITH INDICATOR

(75) Inventor: Michael W. Wilson, Attica, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/634,385

(22) Filed: Aug. 9, 2000

(51) Int. Cl.$^7$ ............ F16H 59/02; F16H 1/06; G05G 5/18
(52) U.S. Cl. .................. 74/473.31; 74/473.1
(58) Field of Search ................ 74/473.1, 473.15, 74/473.3, 473.32, 500.5, 519, 523, 471 XY; 116/28.1

(56) References Cited

U.S. PATENT DOCUMENTS

| | | | | |
|---|---|---|---|---|
| 2,910,156 A | * | 10/1959 | Apple | 192/3 |
| 3,106,198 A | * | 10/1963 | Hansen | 123/179.1 |
| 3,741,148 A | * | 6/1973 | Hauser | 116/28.1 X |
| 3,990,387 A | * | 11/1976 | Martin | 116/28.1 X |
| 4,261,282 A | * | 4/1981 | Saton et al. | 116/28.1 |
| 4,550,675 A | * | 11/1985 | Lansinger et al. | 116/28.1 |
| 4,583,417 A | * | 4/1986 | Hurlow | 74/473.15 |
| 4,635,497 A | * | 1/1987 | Siewert et al. | 74/473.15 X |
| 4,693,135 A | * | 9/1987 | LaRocca et al. | 74/473.21 |
| 4,821,593 A | * | 4/1989 | Kobylarz | 74/473.36 |
| 4,838,197 A | * | 6/1989 | Watson | 116/28.1 |
| 4,934,208 A | * | 6/1990 | Carlstrom | 74/473.15 X |
| 4,955,251 A | * | 9/1990 | Reinert et al. | 74/500.5 X |
| 5,042,316 A | * | 8/1991 | Gressett, Jr. | 74/473.1 |
| 5,287,743 A | * | 2/1994 | Doolittle et al. | 74/471 X |
| 5,289,732 A | | 3/1994 | Snell | |

FOREIGN PATENT DOCUMENTS

DE          3515956       * 7/1986

* cited by examiner

Primary Examiner—David A. Bucci
Assistant Examiner—Colby Hansen
(74) Attorney, Agent, or Firm—Tarolli, Sundheim, Covell & Tummino L.L.P.

(57) ABSTRACT

A shifter assembly (10) for mounting on the steering column (12) of a vehicle (14) and for shifting a transmission (16) having a shift position indicator (30). The shifter assembly (10) comprises a base (50) for supporting the shifter assembly on the vehicle steering column (12), and a shift lever (120) supported on the base (50) for pivotal movement relative to the base about a pivot axis (60). An actuator plate (70) is supported for pivotal movement with the shift lever (120) relative to the base (50) about the pivot axis (60). The actuator plate (70) has first and second attachment portions (96, 110) spaced apart from each other on opposite sides of the pivot axis (60). A transmission actuator cable (150) has a first end portion (152) connected with the first attachment portion (96) of the actuator plate (70) and a second end portion (154) for connection with the vehicle transmission (16). A shift position indicator cable (160) has a first end portion (162) connected with the second attachment portion (110) of the actuator plate (70) and a second end portion (168) for connection with the shift position indicator (30).

5 Claims, 4 Drawing Sheets

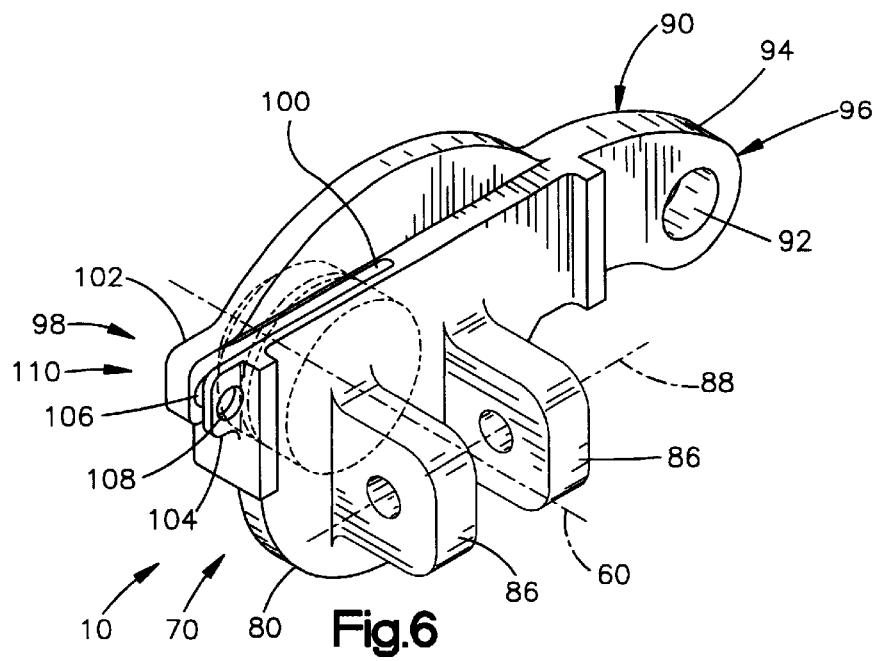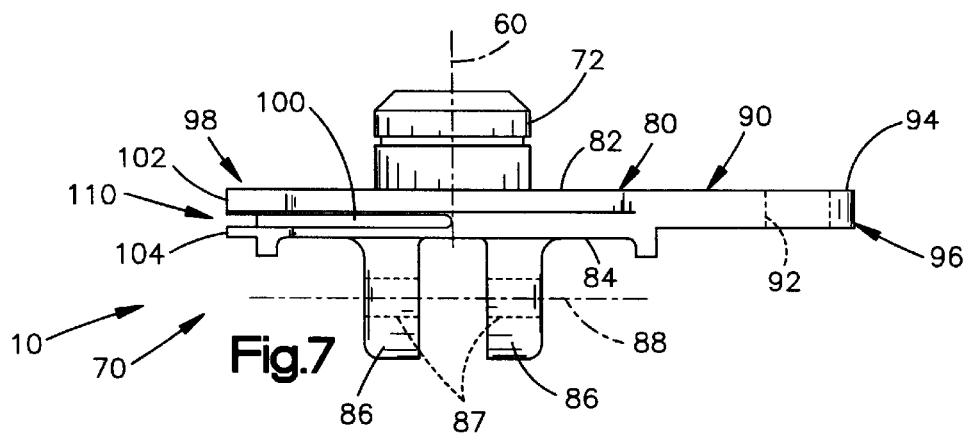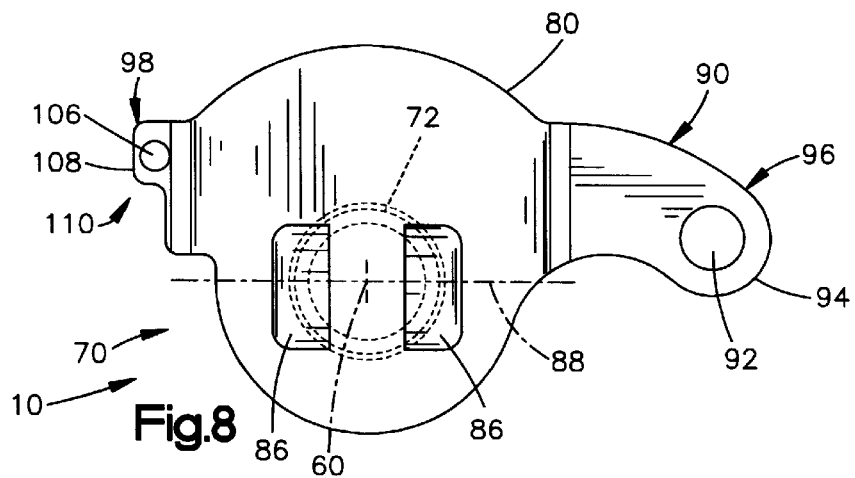

TRANSMISSION SHIFTER ASSEMBLY WITH INDICATOR

BACKGROUND OF THE INVENTION

1. Technical Field

The present invention relates to a transmission shifter assembly for a vehicle. In particular, the present invention relates to a shifter assembly for mounting on the steering column of a vehicle and for shifting a transmission of the vehicle.

2. Description of the Prior Art

A known commercial vehicle has a shifter assembly mounted on the steering column of the vehicle. The shifter assembly includes a manually engageable shift lever supported for pivotal movement on the steering column. Movement of the shift lever is transmitted through one cable to effect shifting of the vehicle transmission, and through another cable to set a shift position indicator. One shifter assembly of this type is shown in U.S. Pat. No. 4,934,208.

SUMMARY OF THE INVENTION

The present invention is a shifter assembly for mounting on the steering column of a vehicle and for shifting a transmission of the vehicle, the vehicle also having a shift position indicator. The shifter assembly comprises a base for supporting the shifter assembly on a vehicle steering column, and a shift lever supported on the base for pivotal movement relative to the base about a pivot axis. An actuator plate is supported for pivotal movement with the shift lever relative to the base about the pivot axis. The actuator plate has first and second attachment portions spaced apart from each other on opposite sides of the pivot axis. A transmission actuator cable has a first end portion connected with the first attachment portion of the actuator plate and a second end portion for connection with the vehicle transmission. A shift position indicator cable has a first end portion connected with the second attachment portion of the actuator plate and a second end portion for connection with the shift position indicator.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 6 is a perspective view of an actuator plate that forms a part of the shifter assembly of FIGS. 1–5;

FIG. 7 is an elevational view of the actuator plate of FIG. 6; and

FIG. 8 is a plan view of the actuator plate of FIG. 6.

DESCRIPTION OF AN EMBODIMENT OF THE INVENTION

Figure 1:
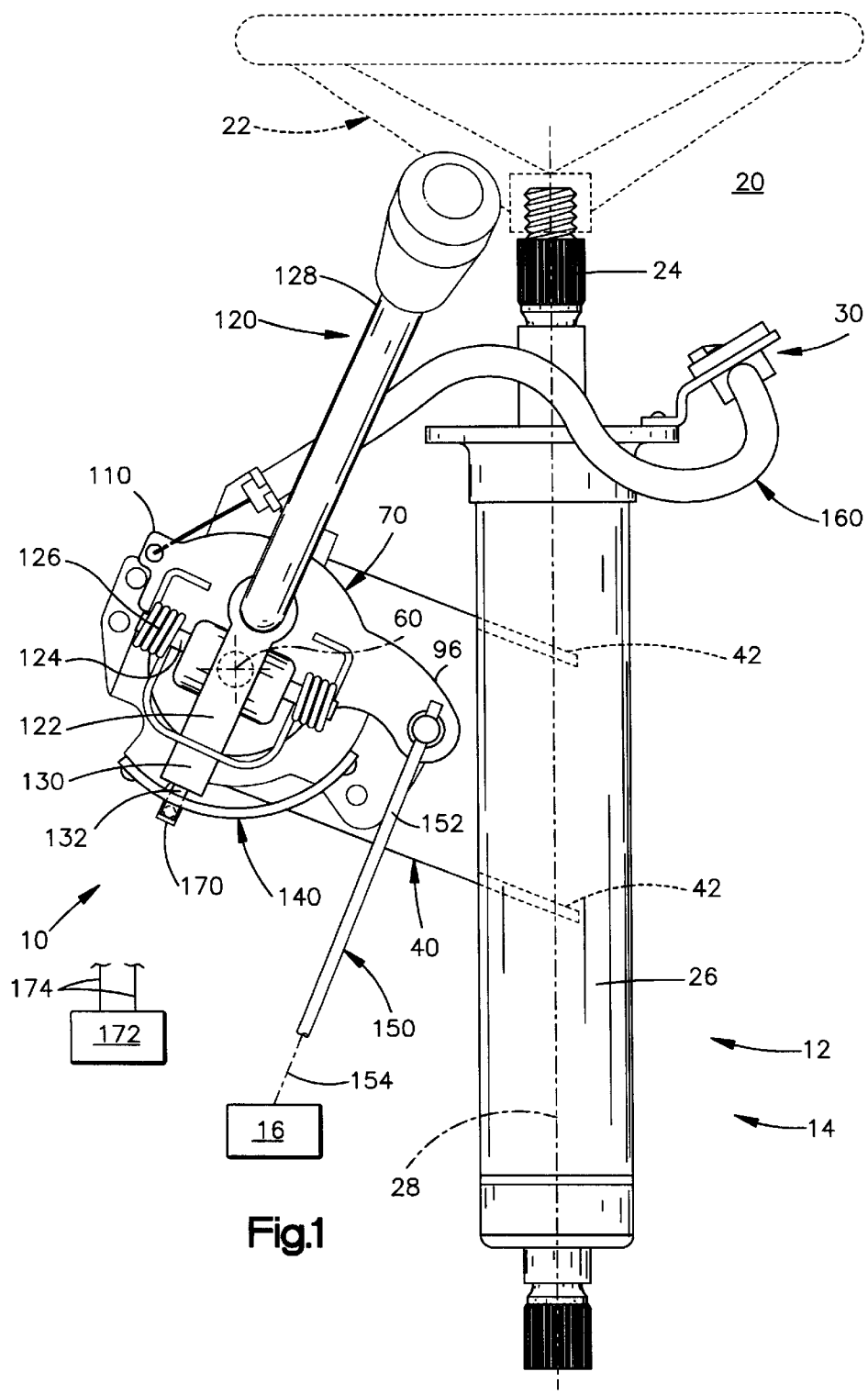
FIG. 1 is a pictorial view of a transmission shifter assembly and shift position indicator in accordance with the present invention, shown mounted on a vehicle steering column.

The present invention relates to a transmission shifter assembly for a vehicle. In particular, the present invention relates to a shifter assembly for mounting on the steering column of a vehicle and for shifting a transmission of the vehicle. The present invention is applicable to various shifter assembly constructions. As representative of the present invention, FIG. 1 illustrates a shifter assembly 10. The shifter assembly 10 is mounted on a steering column 12 of a vehicle 14. The shifter assembly 10 is operable for shifting a transmission (shown schematically at 16) of the vehicle 14.

The steering column 12 extends into the vehicle occupant compartment 20 of the vehicle and includes a steering wheel 22 connected with a steering shaft 24. The steering shaft 24 is rotatable in a steering column tube 26. The steering wheel 22 and steering shaft 24, when rotated about a steering axis 28, effect steering movement of the vehicle 14 in a known manner.

The steering column 12 supports a shift position indicator 30. The shift position indicator 30 includes a pointer 32 movable to different positions along the length of the shift position indicator, to indicate to the driver of the vehicle 14 what gear has been selected for the vehicle transmission 16. It should be understood that other indicator types are usable, such as indicators having additional forward drive positions.

The shifter assembly 10 includes a mounting bracket 40. The mounting bracket 40 is a member (or assembly of members) that supports the other parts of the shifter assembly 10 on the steering column 12. The mounting bracket 40 has flanges 42 fastened to the steering column tube 26 by welding. The shifter assembly 10, as a whole, is thus fixed in position in the vehicle 14.

Figures 2, 3:
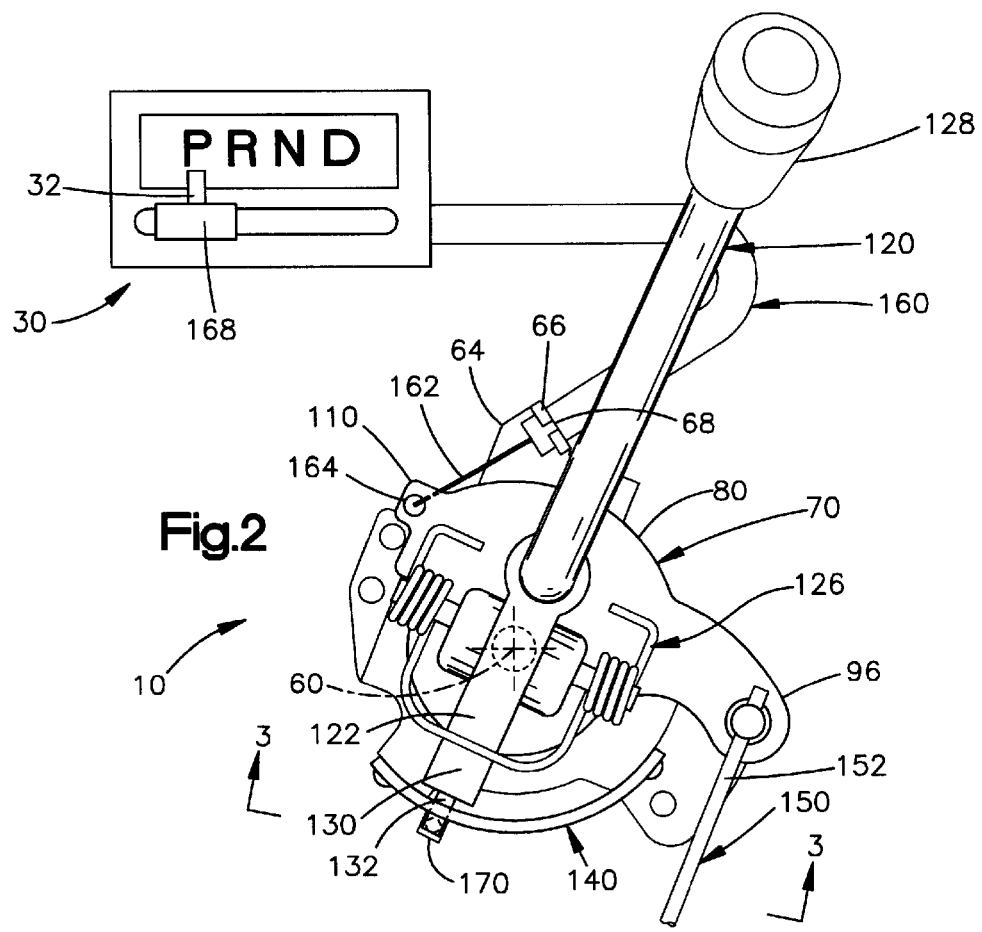
FIG. 2 is a perspective view of the transmission shifter assembly and shift position indicator of FIG. 1, shown in a park position.
FIG. 3 is a side view, taken generally along line 3—3 of FIG. 2, of the shifter assembly of FIG. 2.

The shifter assembly 10 also includes a base 50 (FIG. 3). The base 50 is a metal member having a hat-shaped configuration. The hat-shaped configuration of the base 50 includes first and second L-shaped mounting legs 52 and 54 fixed, by welding or otherwise, to the mounting bracket 40.

A planar central portion 56 of the base 50 extends between the first and second mounting legs 52 and 54. The central portion of the base 50 has a large, circular central opening 58. A first axis, or pivot axis 60, of the shifter assembly 10 extends through the center of the opening 58, in a direction perpendicular to the plane of the central portion 56 of the base 50.

A gate mounting flange 62 extends from one side of the central portion 56 of the base 50, at a location between the two mounting legs 52 and 54. A shift position actuator cable support flange 64 (FIG. 2) extends from the opposite side of the central portion 56 of the base 50, at a location between the two mounting legs 52 and 54. The shift position actuator cable support flange 64 is roughly diametrically opposite the gate mounting flange 62. The shift position actuator cable support flange 64 includes an upstanding portion 66 having an opening 68.

The shifter assembly 10 includes an actuator plate 70. The actuator plate 70, best seen in FIGS. 6–8, is a metal member, preferably cast as one piece from a material such as aluminum.

The actuator plate 70 is supported on the base 50 for pivotal movement relative to the base about the pivot axis 60. A hub 72 on the actuator plate 70 extends through the central opening 58 in the base 50. A snap ring (not shown)

is received in the groove in the hub 72, to secure the actuator plate 70 to the base 50.

The actuator plate 70 has a generally planar main body portion 80. The main body portion 80 has first and second opposite major side surfaces 82 and 84. A pair of journals 86 extend from the second major side surface 84 of the main body portion 80 of the actuator plate 70. The journals 86 are spaced apart from each other.

Aligned circular openings 87 in the journals 86 define a second axis 88 of the shifter assembly 10. The second axis 88 extends through the centers of the openings in the journals 86. The second axis 88 extends parallel to the plane of the main body portion 80 of the actuator plate 70, and perpendicular to the pivot axis 60.

The actuator plate 70 includes a curved arm 90 that projects from the main body portion 80 on one side (to the right as viewed in FIGS. 6–8) of the pivot axis 60. A circular opening 92 is located in an outer end portion 94 of the arm 90. The outer end portion 94 of the arm 90, including the opening 92, forms a transmission actuator cable takeoff 96.

The actuator plate 70 includes a short finger 98 that projects from the main body portion 80 on a second side (to the left as viewed in FIGS. 6–8) of the pivot axis 60. The finger 98 is located on the opposite side of the pivot axis 60 from the transmission actuator cable takeoff 96. The finger 98 is split in two by a slot 100 that extends into the main body portion 80 of the actuator plate 70, in a direction parallel to the plane of the main body portion. The portion of the slot extending through the finger 98 defines first and second sections 102 and 104 of the finger. A circular opening 106 in the first portion 102 of the finger 98 is coaxial with a circular opening 108 in the second portion 104 of the finger. The openings 106 and 108 have the same diameter. The finger 98, including the two openings 106 and 108 and the slot 100, forms a shift position actuator cable takeoff 110.

The shift position actuator cable takeoff 110 is located on the opposite side of the pivot axis 60 from the transmission actuator cable takeoff 96. In the illustrated embodiment, the shift position actuator cable takeoff 110 is located approximately 140 degrees, about the pivot axis 60, from the transmission actuator cable takeoff 96.

The shifter assembly 10 includes a shift lever 120. A base portion 122 of the shift lever 120 is located between the journals 86 of the actuator plate 70. The base portion 122 has an opening (not shown) aligned with the openings in the journals 86. A pin 124 extends through the openings in the journals 86 and through the opening in the base portion 122 of the shift lever 120.

The pin 124 supports the shift lever 120 on the actuator plate 70 for pivotal movement relative to the actuator plate about the second axis 88. The pin 124 also supports the shift lever 120 on the actuator plate 70 for movement with the actuator plate about the pivot axis 60. A spring 126 acting between the actuator plate 70 and the shift lever 120 biases the shift lever about the second axis 88, in a known manner.

A handle portion 128 of the shift lever 120 extends from the base 122 and projects outward into the vehicle occupant compartment. The handle portion 128 of the shift lever 120 is manually engageable by the driver of the vehicle to effect shifting of the vehicle transmission 16.

A detent portion 130 of the shift lever 120 extends from a side of the base 122 opposite the handle portion 128. The detent portion 130 terminates in a detent 132.

The shifter assembly 10 includes a gate 140, which is an arcuater metal member connected by rivets to the first mounting leg 52 of the base 50 and to the gate mounting flange 62 of the base. The gate is thereby fixed in position on the steering column 12.

The gate 140 has a gate opening 142 defined on one side by a non-linear edge 144. The edge 144 has surfaces that define between them a plurality of different notches for receiving the detent 132, as described below. The notches define a corresponding plurality of different shift positions of the shifter assembly 10 and, thereby, of the transmission 16.

Figure 4:
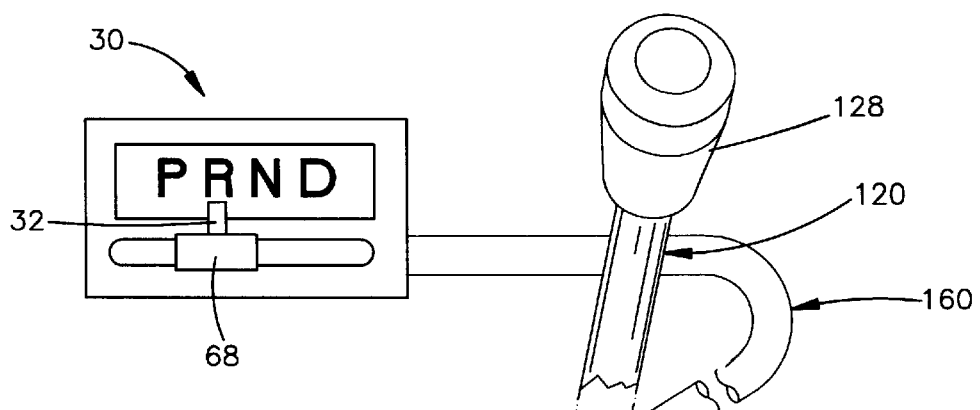
FIG. 4 is a view similar to FIG. 2 showing the transmission shifter assembly and shift position indicator in a reverse position.
Figure 4:
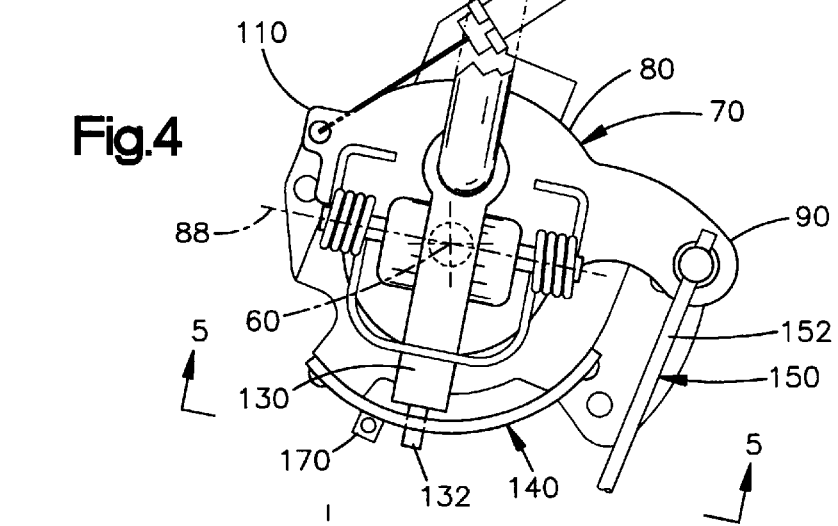
Figure 5:
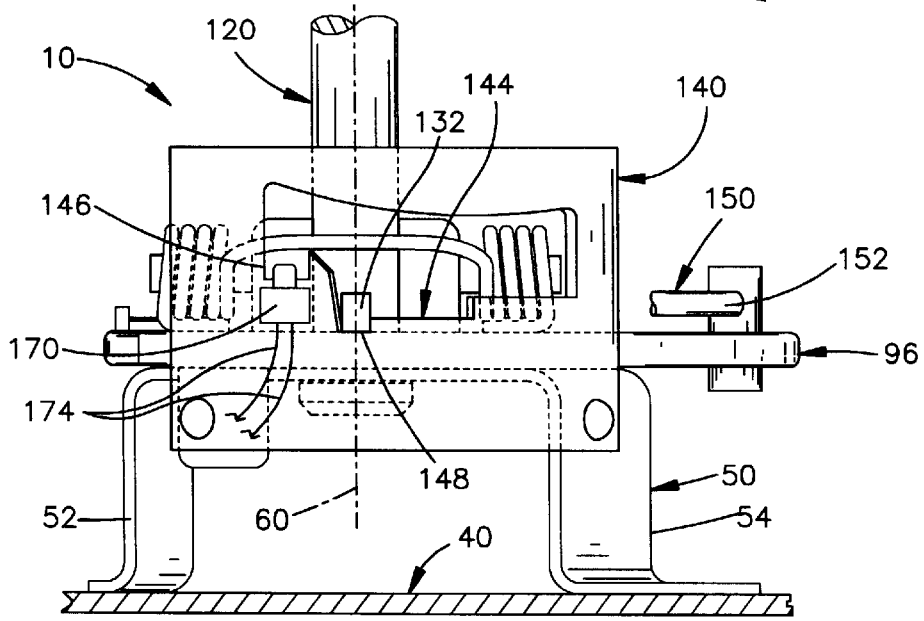
FIG. 5 is a view similar to FIG. 3 taken along line 5—5 of FIG. 4.

The plurality of notches includes a park position notch 146 (FIGS. 2 and 3), and a reverse position notch 148 (FIGS. 4 and 5). The detent 132 on the shift lever 120 is received in the gate opening 142 in the gate 140 and is movable between the different notches in the gate opening, including the notches 146 and 148 corresponding to the various shift positions of the shifter assembly 10, upon manual movement of the shift lever 120.

The shifter assembly 10 includes a transmission actuator rod or cable 150. One end portion 152 of the transmission actuator cable 150 is connected with and extends from the transmission actuator cable takeoff 96. The opposite end portion (indicated schematically at 154) is connected with the vehicle transmission 16.

The shifter assembly 10 also includes a shift position actuator cable 160. One end portion 162 of the shift position actuator cable 160 is connected with and extends from the shift position actuator cable takeoff 110. The shift position actuator cable 160 extends through the opening 68 in the upstanding portion 66 of the actuator cable support flange 64.

The shift position actuator cable 160 is extensible along the slot 100 in the actuator plate 70. The cable 160 terminates in a cylindrical button 164 that is snapped into the openings in the finger 98. The cable 160 extends out through the slot 100, and the tension on the cable holds the button 164 in the finger 98. The opposite end portion 168 of the shift position actuator cable 160 is connected with the shift position indicator pointer 32.

The shifter assembly 10 includes an electrical switch 170 for actuating a parking brake of the vehicle. The electrical switch 170 is a known device, such as a microswitch. The switch 170 is actuatable to effect engagement of the vehicle parking brake, which is shown schematically at 172.

The switch 170 is mounted on the gate 140, adjacent the park notch 146 in the gate opening 142. Lead wires 174 extend from the switch 170 and are connected with the parking brake 172. The detent 132 has a surface 176 for engagement with the switch 170 to actuate the vehicle parking brake 172 simultaneously with movement of the shift lever into the park notch 146.

FIGS. 2 and 3 illustrate the shifter assembly 10 in the park condition. The detent 132 on the shift lever 120 is in the park notch 146 in the gate opening 142 in the gate 140. The actuator plate 70 is in a first position of rotation relative to the base 50.

Upon manual movement of the shift lever 120 from the park position shown in FIG. 2 to the reverse position shown in FIG. 4, the detent 132 moves out of the park notch 146 in the gate 140. The movement of the shift lever 120 is transmitted through the journals 86 into the actuator plate 70. The actuator plate 70 pivots about the pivot axis 60, relative to the base 50, along with the shift lever 120. The detent 132 moves to a position over the reverse notch 148 in the gate 140. When the vehicle operator then releases the shift lever 120, the spring 126 causes the shift lever to pivot about the second axis 88 so that the detent 132 moves into the reverse notch 148 in the gate 146.

As the actuator plate 70 pivots about the second axis 88 relative to the base 50, the actuator plate transmits the force of the shift lever 120 through the transmission actuator cable takeoff 96 into the transmission actuator cable 150. A tensile force is exerted on the transmission actuator cable 150. This tensile force causes the transmission actuator cable 150 to effect shifting of the vehicle transmission 16 into reverse gear.

Simultaneously, the actuator plate 70 transmits the force of the shift lever 120 through the shift position actuator cable takeoff 110 into the shift position actuator cable 160. A tensile force is exerted on the shift position actuator cable 160. This tensile force causes the shift position cable 160 to effect movement of the shift position indicator pointer 32 into the reverse position, as shown in FIG. 4.

Because the shift position actuator cable takeoff 110 is located on the opposite side of the pivot axis 60 from the transmission actuator cable takeoff 96, both cables 150 and 160 are pulled when the shifter assembly 10 is shifted from park into reverse. The cable ends attached to the actuator plate 70 move in opposite directions from each other.

In addition, the lines of action of the two cables 150 and 160 are not parallel to each other. Specifically, the line of action of the transmission actuator cable 150, as can be seen in FIG. 4, extends at an angle of about thirty-six degrees to the line of action of the shift position actuator cable 160.

When the shifter assembly 10 is in the park condition, the detent 132 engages the microswitch 170. The engagement of the detent 132 with the microswitch 170 effects engagement of the vehicle parking brake 172. This engagement occurs simultaneously with movement of the shift lever 120 into the park position.

From the above description of the invention, those skilled in the art will perceive improvements, changes and modifications in the invention. Such improvements, changes and modifications within the skill of the art are intended to be covered by the appended claims.

Having described the invention, I claim:

1. A shifter assembly for mounting on the steering column of a vehicle and for shifting a transmission of the vehicle, the vehicle also having a shift position indicator, said shifter assembly comprising:

a base for supporting said shifter assembly on a vehicle steering column;

a shift lever supported on said base for pivotal movement relative to said base about a pivot axis;

an actuator plate supported for pivotal movement with said shift lever relative to said base about said pivot axis;

said actuator plate having first and second attachment portions spaced apart from each other on opposite sides of said pivot axis;

a transmission actuator cable having a first end portion connected with said first attachment portion of said actuator plate and having a second end portion for connection with the vehicle transmission; and a shift position indicator cable having a first end portion connected with said second attachment portion of said actuator plate and having a second end portion for connection with the shift position indicator.

2. A shifter assembly as set forth in claim 1 wherein said first and second attachment portions are spaced apart by at least about ninety degrees circumferentially about said pivot axis.

3. A shifter assembly as set forth in claim 1 wherein said first and second attachment portions are spaced apart by at least about one hundred twenty degrees circumferentially about said pivot axis.

4. A shifter assembly as set forth in claim 1 comprising:

a detent member supported for movement by said shift lever;

a gate having surfaces defining a plurality of different locations for receiving said detent member to thereby define a corresponding plurality of different shift positions of said shift lever, said plurality of shift positions of said shift lever including a park position of said shift lever; and an electrical switch for actuating a parking brake of the vehicle;

said detent member having a surface for engagement with said switch to actuate the vehicle parking brake contemporaneously with movement of said shift lever into the park position.

5. A shifter assembly as set forth in claim 1 wherein said second attachment portion of said actuator plate has a slot, said second end portion of said shift position indicator cable snapping into said slot to connect said second end portion of said shift position indicator cable for movement with said actuator plate.

* * * * *